United States Patent
Yano

(10) Patent No.: US 10,488,211 B2
(45) Date of Patent: Nov. 26, 2019

(54) TRANSPORTATION DEMAND-AND-SUPPLY MATCHING SYSTEM AND TRANSPORTATION DEMAND-AND-SUPPLY MATCHING METHOD

(71) Applicant: Hitachi, Ltd., Tokyo (JP)

(72) Inventor: Kojin Yano, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 156 days.

(21) Appl. No.: 15/814,602

(22) Filed: Nov. 16, 2017

(65) Prior Publication Data

US 2018/0172460 A1 Jun. 21, 2018

(30) Foreign Application Priority Data

Nov. 21, 2016 (JP) ................................. 2016-225688

(51) Int. Cl.
*G01C 21/34* (2006.01)
*B61L 3/00* (2006.01)
(Continued)

(52) U.S. Cl.
CPC .......... *G01C 21/3415* (2013.01); *B61L 3/006* (2013.01); *B61L 27/0011* (2013.01);
(Continued)

(58) Field of Classification Search
CPC ............ G01C 21/3415; G01C 21/3492; G01C 21/3691; B61L 3/006; B61L 27/0011;
(Continued)

(56) References Cited

U.S. PATENT DOCUMENTS 9,349,285 B1* 5/2016 Fowe ....................... G08G 1/00
2010/0292921 A1* 11/2010 Zachariah .............. G06Q 10/00
701/533

(Continued)

FOREIGN PATENT DOCUMENTS

GB 2508508 A 6/2014
JP 2011-022646 A 2/2011

OTHER PUBLICATIONS

Extended European Search Report received in corresponding European Application No. 17202111.5 dated May 7, 2018.
(Continued)

*Primary Examiner* — Calvin Cheung
(74) *Attorney, Agent, or Firm* — Mattingly & Malur, PC

(57) ABSTRACT

To facilitate determination of start of an operation of a new transportation that can cope with the travel demand in an area where multiple transportations and travel routes are present. A transportation demand and supply matching system 10 includes a storage device 2011 that stores information on travel demand and transportation supply capability in a predetermined area, and an arithmetic device 2041 that estimates a congested transportation and a congested route in the area based on the information on the travel demand and the transportation supply capability, estimates an avoidance route for avoiding the congested route, and a provisional transportation which is not operated but has to be operated on the avoidance route in the area by a predetermined algorithm, and outputs information on each of the avoidance route and the provisional transportation to a predetermined device.

12 Claims, 15 Drawing Sheets

(51) Int. Cl.
*B61L 27/00* (2006.01)
*G01C 21/36* (2006.01)
*G08G 1/0968* (2006.01)

(52) U.S. Cl.
CPC ....... *B61L 27/0016* (2013.01); *B61L 27/0027* (2013.01); *G01C 21/3492* (2013.01); *G01C 21/3691* (2013.01); *G08G 1/096827* (2013.01); *G08G 1/096838* (2013.01); *G08G 1/096844* (2013.01)

(58) Field of Classification Search
CPC ............. B61L 27/0016; B61L 27/0027; G08G 1/096827; G08G 1/096838; G08G 1/096844
See application file for complete search history.

(56) References Cited

U.S. PATENT DOCUMENTS

| | | | | |
|---|---|---|---|---|
| 2010/0305984 A1* | 12/2010 | Ben-Yitschak | ........ | G06Q 10/02 705/6 |
| 2013/0046456 A1* | 2/2013 | Scofield | ............. | G01C 21/3423 701/117 |
| 2013/0238241 A1* | 9/2013 | Chelotti | ............. | G01C 21/3617 701/533 |
| 2014/0100780 A1* | 4/2014 | Caine | .................... | G01C 21/32 701/533 |
| 2015/0329129 A1 | 11/2015 | Sengupta et al. | | |
| 2016/0047666 A1* | 2/2016 | Fuchs | .................... | G06Q 40/08 701/423 |
| 2016/0334797 A1* | 11/2016 | Ross | ........................ | G08G 1/20 |
| 2017/0146353 A1* | 5/2017 | Kroeller | ................ | H04W 4/029 |
| 2017/0211942 A1* | 7/2017 | Carter | ................ | G01C 21/3484 |
| 2017/0213273 A1* | 7/2017 | Dietrich | ................ | G06Q 30/0631 |
| 2018/0051997 A1* | 2/2018 | Grochocki, Jr. | ... | G01C 21/3415 |

OTHER PUBLICATIONS

Razouqi, Q. et al., "RYNSORD: A Novel, Decentralized Algorithm for Railway Networks with Soft Reservation", Vehicular Technology Conference, 1998, pp. 2585-2589.

* cited by examiner

TRAVEL DEMAND PROPOSAL 20

| PASSENGER 201 | TRAVEL DEMAND 202 | ROUTE 203 | TRANSPORTATION 204 | DEPARTURE AND ARRIVAL 205 | HOURS 206 | FARE RANGE 221 | FINALIZATION 222 | CANDIDATE 223 |
|---|---|---|---|---|---|---|---|---|
| 1001 | D0001 | R001 | T RAILROAD | A→B | 15:00–15:10 | 300–500 | | ○ |
| 1001 | D0001 | R001 | U RAILROAD | B→C | 15:00–15:30 | | | |
| 1001 | D0001 | R002 | K RAILROAD | A→F | | | | |
| 1001 | D0001 | R002 | V RAILROAD | F→G | | 700–800 | | |
| 1001 | D0001 | R002 | I BUS | G→C | | | | |
| 1001 | D0002 | R004 | V RAILROAD | G→F | | | | |
| 1001 | D0002 | R004 | M BUS | F→S | | 200–250 | | |
| 1001 | D0002 | R004 R008 | I BUS | S→A | | | | |
| 1002 | D0001 | R009 | | | | 300–400 | ○ | |
| 1002 | D0002 | R010 | | | | 400–500 | ○ | |
| 1002 | D0003 | | | | | | | |
| .. | | | | | | | | |

FIG. 3

TRANSPORTATION SUPPLY PROPOSAL 30

| TRANSPORTATION | RESOURCES | HOURS | ROUTE | FINALIZATION | PROVISIONAL |
|---|---|---|---|---|---|
| A0001 | R01 | 15:00–16:00 | A→B→C | | |
| A0001 | R01 | 15:00–16:00 | E→F | ○ | |
| A0001 | R02 | 20:00–22:00 | A→S→P | | ○ |
| A0002 | R35 | 7:00–8:00 | A→B | | |
| A0002 | R35 | 8:30–9:00 | E→C | | |
| .. | .. | | | | |

FIG. 4

TRAVEL DEMAND

| PASSENGER | TRAVEL DEMAND | ROUTE | TRANSPORTATION | DEPARTURE AND ARRIVAL | HOURS | CORRESPONDING TRANSPORTATION | CORRESPONDING RESOURCES |
|---|---|---|---|---|---|---|---|
| 1001 | D0001 | R001 | T RAILROAD | A→B | 15:00– 15:15 | A0001 | R01 |
| 1001 | D0001 | R001 | U RAILROAD | B→C | 15:20– 15:45 | A0005 | R07 |
| 1001 | D0002 | R004 | V RAILROAD | G→F | | | |
| 1001 | D0002 | R004 | M BUS | F→S | | | |
| 1001 | D0002 | R004 | I BUS | S→A | | | |
| 1002 | D0001 | | | | | | |
| 1002 | D0002 | | | | | | |
| 1002 | D0003 | | | | | | |
| .. | | | | | | | |

TRANSPORTATION SUPPLY

| TRANSPORTATION | RESOURCES | HOURS | ROUTE | FINALIZATION | PROVISIONAL |
|---|---|---|---|---|---|
| A0001 | R01 | 15:00−15:15 | A→B | ○ | |
| A0001 | R02 | 20:00−22:00 | A→S→P | | |
| A0005 | R07 | 15:20−15:45 | B→C | ○ | |
| A0002 | R35 | 7:00−8:00 | A→B | | |
| A0002 | R35 | 8:30−9:00 | E→C | | |
| .. | .. | | | | |

FIG. 5B

TRAVEL DEMAND HISTORY 50

| PASSENGER | TRAVEL DEMAND | ROUTE | TRANSPORTATION | DEPARTURE AND ARRIVAL | YEAR-MONTH-DAY | HOURS | CORRESPONDING TRANSPORTATION | CORRESPONDING RESOURCES |
|---|---|---|---|---|---|---|---|---|
| 1001 | D0001 | R001 | T RAILROAD | A→B | 2015/1/22 | 15:00 – 15:15 | A0001 | R01 |
| 1001 | D0001 | R001 | U RAILROAD | B→C | 2015/1/22 | 15:20 – 15:45 | A0005 | R07 |
| 1001 | D0002 | R004 | V RAILROAD | G→F | 2015/1/22 | | | |
| 1001 | D0002 | R004 | M BUS | F→S | | | | |
| 1001 | D0002 | R004 | I BUS | S→A | | | | |
| 1002 | D0001 | | | | | | | |
| 1002 | D0002 | | | | | | | |
| 1002 | D0003 | | | | | | | |
| .. | | | | | | | | |

FIG. 6

PASSENGER CHARACTERISTICS

| PASSENGER | TIME EFFECT | CONGESTION EFFECT | FARE EFFECT | TRANSFER EFFECT | SHOPPING EFFECT | PAYMENT INTENTION (yen/km/hr) |
|---|---|---|---|---|---|---|
| 1001 | 0.6 | 0.2 | 0.1 | 0.1 | 0 | 100 |
| 1002 | 0.1 | 0.7 | 0.1 | 0 | 0.1 | 200 |
| 1003 | 0 | 0 | 0.7 | 0 | 0.3 | 150 |
| .. | | | | | | |

FIG. 7

ENTITY CHARACTERISTICS

| TRANSPORTATION | LOWEST OCCUPANCY RATE(%) | LOWEST FARE (yen) | DESIRABLE OCCUPANCY RATE(%) | DESIRABLE FARE(yen) | DESIRABLE HOURS |
|---|---|---|---|---|---|
| A0001 | 25 | 300 | 30 | 350 | 9:00 – 13:00 |
| A0002 | 30 | 200 | 40 | 300 | 6:00 – 10:00 |
| A0003 | 35 | 500 | 50 | 500 | 5:00 – 8:00 |
| A0004 | 15 | 100 | 30 | 150 | 7:00 – 18:00 |
| A0005 | 20 | 300 | 30 | 400 | 10:00 – 23:00 |
| .. | | | | | |

FIG. 8

TRANSPORTATION DEMAND-AND-SUPPLY MATCHING SYSTEM AND TRANSPORTATION DEMAND-AND-SUPPLY MATCHING METHOD

CROSS-REFERENCE TO RELATED APPLICATION

This application claims priority pursuant to 35 U.S.C. § 119 from Japanese Patent Application No. 2016-225688, filed on Nov. 21, 2016, of which is incorporated herein by reference.

BACKGROUND

Technical Field

The present invention relates to a transportation demand-and-supply matching system and a transportation demand-and-supply matching method, and particularly relates to a technique that facilitates determination of propriety of starting an operation of a new transportation that can cope with the travel demand in an area where multiple transportations and travel routes are present.

Related Art

In areas such as urban areas, various transportations are present, for instance, public transportations such as railroads, buses, and taxis, or personal transportations such as private cars, and bicycles. In recent years, new services such as a cycle share and a ride share, in which bicycles and privately-owned cars are shared and used by users, have been launched.

Thus, when a passenger travels within a certain area, it is often the case that the passenger transfers multiple transportations for traveling. For instance, when 'A station' is a departure place and 'B showroom' is a destination, a passenger rides on 'C railroad' at 'A station' for 'D station,' transfers to 'E railroad' at 'D station,' arrives at a nearby station of 'B showroom,' and walks from the station to 'B showroom.'

Due to the presence of the above-described various transportations, such transfer often involves multiple routes. For instance, in the above-described route from 'A station' to 'B showroom,' another route may be taken as follows: a passenger rides on 'C railroad' at 'A station' for 'X station,' transfers to 'E railroad' at 'X station,' arrives at a nearby station of 'B showroom,' and walks from the station to 'B showroom.' Like this, in many cases, when a passenger heads for a destination, multiple transportations and multiple routes are involved.

Meanwhile, nowadays, urbanization is progressing in countries, and even if the aforementioned multiple routes are present, traffic jam and traffic congestion in urban areas are becoming a global common problem. One of the causes of jam and congestion is probably mismatching between the travel demand of passengers and the transportation supply capability of transportations.

For instance, the number of buses bound from 'A station' to 'B showroom' is insufficient, and thus a situation may occur in which a long line is formed at a bus stop near 'A station.' Thus, it is necessary to provide appropriate transportation supply capability based on prediction of the travel demand of passengers.

As measure to address such a problem, there is a method using a transportation history (reservation history) and an operation history in the past. For instance, an operation scheduling system (see Japanese Unexamined Patent Application Publication No. 2011-22646) for an on-demand bus has been proposed, the system including: a database that stores operation records related to reservations and records regarding incoming and outgoing passengers of an on-demand bus; a unit that extracts characteristic information on incoming and outgoing passengers in advance from the operation records stored in the database, and that stores the extracted characteristic information, and information indicating the reservations included in the operation records corresponding to the extracted characteristic information into the database in association with each other; and another unit that, when the present situations that determine an operation schedule match situations indicated by the characteristic information, determines the operation schedule of the on-demand bus based on the reservation information included in the operation records corresponding to the matching characteristic information.

SUMMARY OF THE INVENTION

However, in related art, only the operation records related to the transportations of specific companies are used, and the operation records related to the transportations of other companies are not taken into consideration together. For instance, in the above-described example of going to 'B showroom' from 'A station,' while the travel demand for riding on a bus from 'A station' is estimated based on the operation history of 'the bus of A corporation,' it is not possible to take occurrence of travel demand associated with suspension of operation of 'E railroad' into consideration.

Under such situations, even when a new (including a temporary concept) operation route is planned to satisfy the travel demand from passengers, it is difficult for any transportation entity to decide to establish an operation route unless the reasons for favorable profitability. This is because once an operation route is established, even if travel demand decrease to some extent, it is difficult to halt the operation because of public nature of transportation business.

Thus, an object of the present invention is to provide a technique that facilitates determination of propriety of starting an operation of a new transportation that can cope with the travel demand in an area where multiple transportations and travel routes are present.

A transportation demand-and-supply matching system of the present disclosure that addresses the above-mentioned problem includes a storage device that stores information on travel demand and transportation supply capability in a predetermined area; and an arithmetic device that estimates a congested transportation and a congested route in the area based on the information on the travel demand and the transportation supply capability, estimates an avoidance route for avoiding the congested route, and a provisional transportation which is not operated but has to be operated on the avoidance route in the area by a predetermined algorithm, and outputs information on each of the avoidance route and the provisional transportation to a predetermined device.

A transportation demand-and-supply matching method of the present disclosure is to be performed by an information processing system including a processor and a storage device that stores information on travel demand and transportation supply capability in a predetermined area, the method including: estimating a congested transportation and a congested route in the area based on the information on the travel demand and the transportation supply capability; and estimating an avoidance route for avoiding the congested route, and a provisional transportation which is not operated but has to be operated on the avoidance route in the area by a predetermined algorithm, and outputting information on each of the avoidance route and the provisional transportation to a predetermined device.

According to the present invention, determination of propriety of starting an operation of a new transportation that can cope with the travel demand is facilitated in an area where multiple transportations and travel routes are present.

BRIEF DESCRIPTION OF THE DRAWINGS

FIG. 3 is a diagram illustrating a data structure example regarding a travel demand proposal in this embodiment.

FIG. 4 is a diagram illustrating a data structure example regarding a transportation supply proposal for a transportation in this embodiment.

FIG. 5A is a diagram illustrating a data structure example of travel demand in this embodiment.

FIG. 5B is a diagram illustrating a data structure example of transportation supply in this embodiment.

FIG. 6 is a diagram illustrating a data structure example regarding a travel demand history in this embodiment.

FIG. 7 is a diagram illustrating a data structure example indicating passenger characteristics in this embodiment.

FIG. 8 is a diagram illustrating a data structure example indicating entity characteristics in this embodiment.

DETAILED DESCRIPTION OF THE INVENTION (System Configuration)

Figure 1:
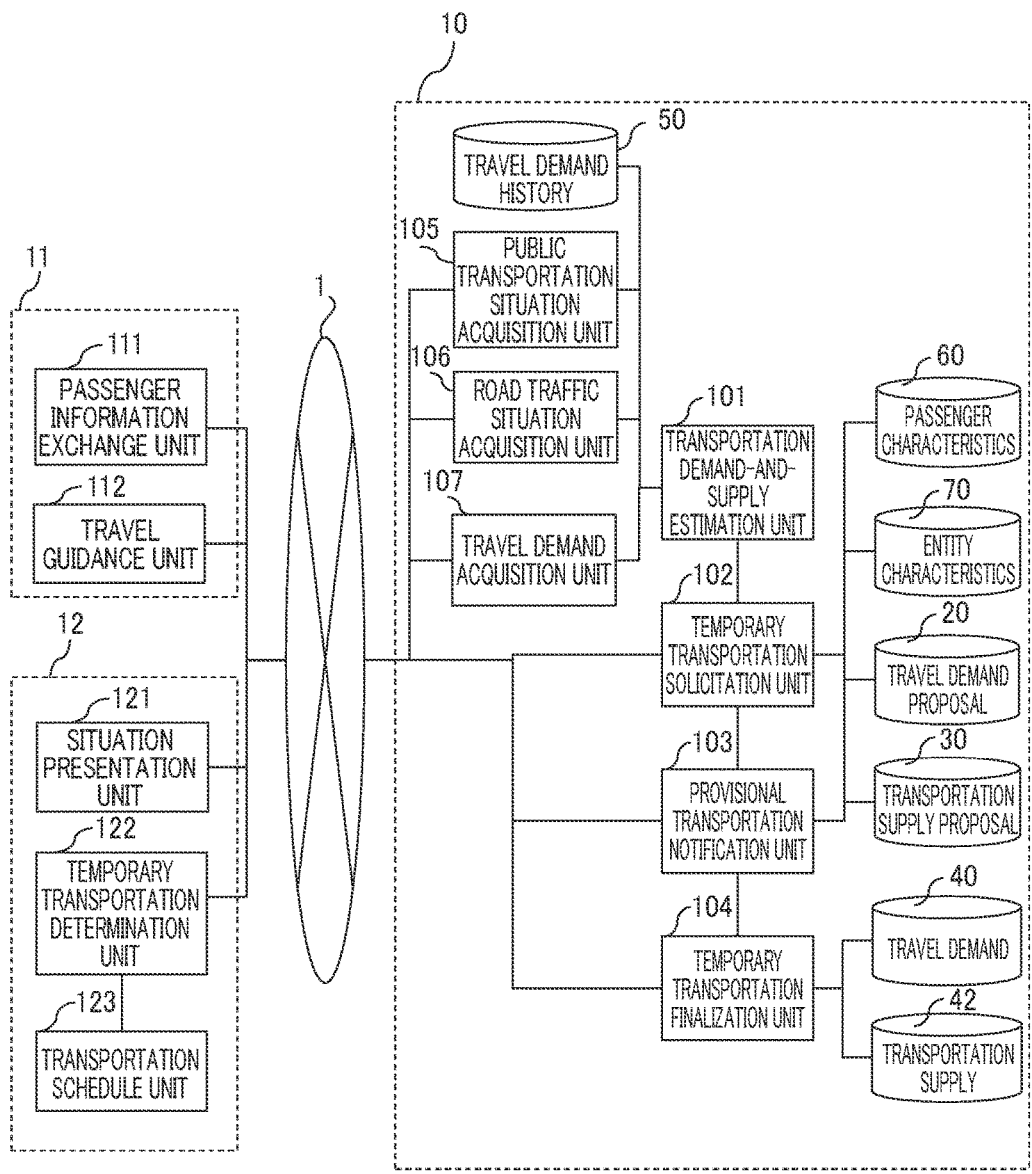
FIG. 1 is a diagram illustrating a network configuration example including a transportation demand-and-supply matching system in this embodiment.
Figure 2:
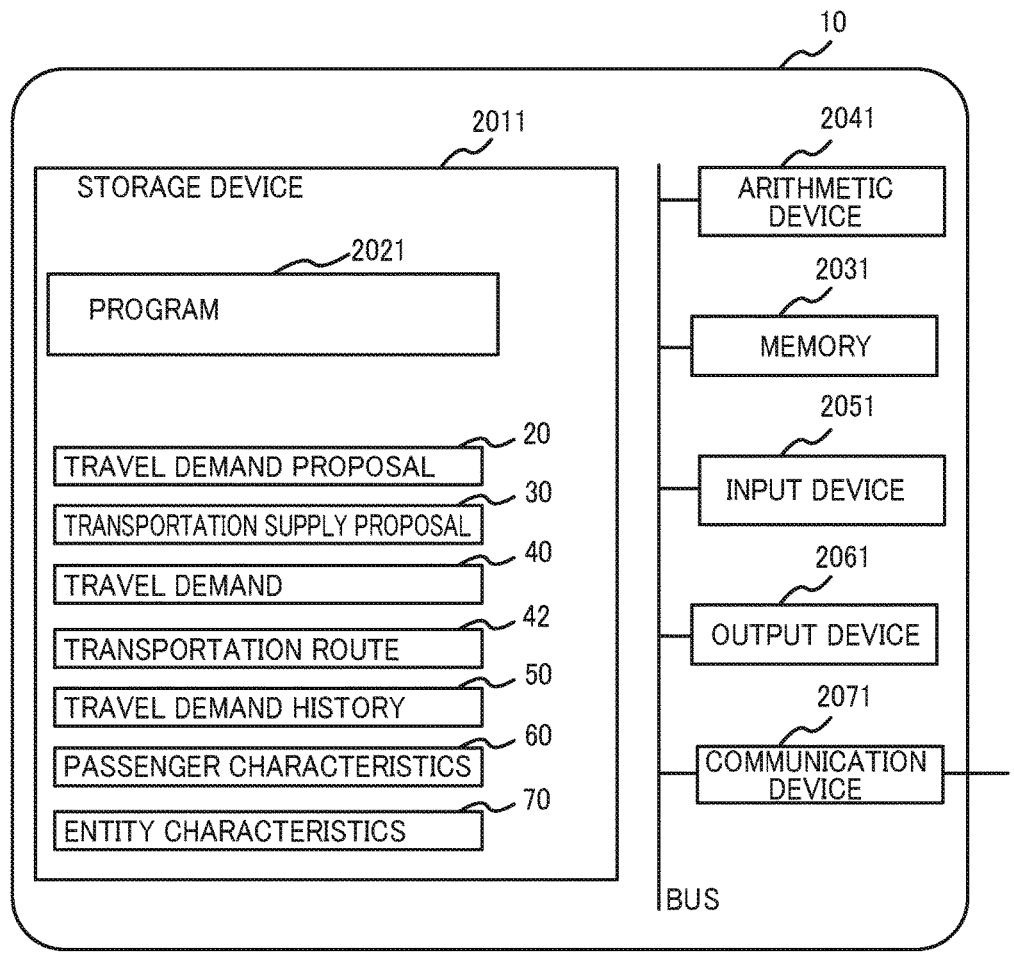
FIG. 2 is a diagram illustrating a hardware configuration example of the transportation demand-and-supply matching system in this embodiment.

Hereinafter, an embodiment of the present invention will be described in detail with reference to the drawings. FIG. 1 is a network configuration example including a transportation demand-and-supply matching system 10 in this embodiment, and FIG. 2 is a diagram illustrating a hardware configuration example of the transportation demand-and-supply matching system.

The transportation demand-and-supply matching system 10 illustrated in FIG. 1 is a computer system that facilitates determination of propriety of starting an operation of a new transportation that can cope with the travel demand in an area where multiple transportation systems and travel routes are present.

The transportation demand-and-supply matching system 10 in this embodiment is communicably coupled to a passenger terminal 11 (such as a smartphone, PC) operated by a passenger, and an entity system 12 of an entity (hereinafter a transportation entity) who operates a transportation, via a network 1.

The hardware configuration of the transportation demand-and-supply matching system 10 is as follows: a storage device 2011 including a suitable non-volatile memory element such as a solid state drive (SSD) or a hard disk drive; a memory 2031 including a volatile memory element such as a RAM; an arithmetic device 2041 such as a CPU that executes a program 2021 stored in the memory 2031 or the storage device 2011, and performs integrated control of the device itself as well as various types of determination, calculation and control processing; an input device 2051 that receives a key input and a voice input from a user; an output device 2061 such as a display that displays processed data; and a communication device 2071 that is coupled to the network 1 and that performs communication processing with other devices.

It is to be noted that in addition to the program 2021 for implementing desirable functions as the transportation demand-and-supply matching system 10 in this embodiment, the storage device 2011 stores at least data for each of passenger characteristics 60, entity characteristics 70, a travel demand proposal 20, a transportation supply proposal 30, a travel demand 40, a transportation supply 42, a travel demand history 50.

The arithmetic device 2041 of the transportation demand-and-supply matching system 10 executes, for instance, the program 2021 of the storage device 2011, thereby implementing the following function units in the memory 2031: a transportation demand-and-supply estimation unit 101, a temporary transportation solicitation unit 102, a provisional transportation notification unit 103, a temporary transportation finalization unit 104, a public transportation situation acquisition unit 105, a road traffic situation acquisition unit 106, and a travel demand acquisition unit 107.

Among these, the public transportation situation acquisition unit 105 is a processing unit that obtains an operation schedule, and an operation situation of a public transportation such as a railroad, or a bus. The operation schedule and the operation situation are obtained from the entity system 12 of each transportation entity, or an appropriate information providing system via the network 1.

The operation schedule obtained by the public transportation situation acquisition unit 105 indicates the diagram at the time of planning by a transportation entity, and by the operation schedule, the connection, and transportation time of the route network of each transportation entity can be identified. Also, the operation situation indicates the execution situations of each diagram provided by a transportation entity, and for instance, in the case of delay, the operation situation is acquirable as a diagram delayed from the schedule.

Also, the road traffic situation acquisition unit 106 is a processing unit that obtains the situation of the traffic flow of a road traffic. The information obtained by the road traffic situation acquisition unit 106 indicates connection between roads, and the transportation volumes of roads. It is to be noted that the road traffic situation acquisition unit 106 may obtain the transportation volume of each road from an external system via the network 1.

Also, the travel demand acquisition unit 107 is a processing unit that obtains the situation of the travel demand. The information obtained by the travel demand acquisition unit 107 is the travel demand obtained from the passenger terminal 11 of each passenger, and with these pieces of information, it is possible to identify how much travel demand is there for which route in which hours. It is to be noted that instead of the processing in the travel demand acquisition unit 107, information on the travel demand may be obtained from a predetermined external system via the network 1.

Also, the transportation demand-and-supply estimation unit 101 is a processing unit that calculates a degree of the transportation supply capability for the travel demand at the present time based on the processed contents of the public transportation situation acquisition unit 105, the road traffic situation acquisition unit 106, and the travel demand acquisition unit 107 described above, and the travel demand history 50, and estimates a transportation and a route, for which the transportation supply capability is insufficient for the travel demand.

Also, the temporary transportation solicitation unit 102 is a processing unit that solicits a temporary transportation necessary for avoiding congestion from transportation companies based on the above-mentioned processing result of the transportation demand-and-supply estimation unit 101. Also, the processing unit holds the content of acceptance from each transportation entity for the above-mentioned solicitation, determines a preferred transportation based on entity characteristic information, and sets a provisional transportation.

Also, the provisional transportation notification unit 103 is a processing unit that notifies each passenger and each transportation entity of the provisional transportation determined by the temporary transportation solicitation unit 102. The processing unit further collects from the passenger information on presence or absence of intention of utilizing the provisional transportation at the time of implementation of the operation, and estimates the number of actual passengers.

Also, the temporary transportation finalization unit 104 checks a result of estimate of the number of actual passengers with the entity characteristics of transportation entity, and determines implementation of the provisional transportation. When implementation of the provisional transportation is finalized, the passengers and the transportation companies are notified of the finalization.

Also, a passenger information exchange unit 111 in the passenger terminal 11 is a terminal that presents a result of route retrieval and a provisional transportation to the passenger who is an operator of the passenger terminal 11. Also, the passenger terminal 11 includes an interface for expressing an intention of utilizing a provisional transportation which is presented by the transportation demand-and-supply matching system 10 is actually operated.

Also, a travel guidance unit 112 is a function unit that guides a route retrieved by the above-mentioned route retrieval to a passenger. For instance, the travel guidance unit 112 indicates a travel direction at the time of transfer, and presents a time limit for riding on a target transportation.

A situation presentation unit 121 in the entity system 12 is a function unit that presents a solicitation status of a temporary transportation, calculated by the temporary transportation solicitation unit 102 of the transportation demand-and-supply matching system 10. Multiple temporary transportations may be presented, and one or more preferred temporary transportations may be selected by a transportation entity.

Also, a temporary transportation determination unit 122 in the entity system 12 is a function unit that determines propriety of provision by transportation companies for a proposal of a temporary transportation from the transportation demand-and-supply matching system 10. The processing unit is coupled to a transportation schedule unit 123, and performs change calculation for a transportation schedule to determine whether the proposal of a temporary transportation is feasible. When information on changeable (changeable as the schedule) transportation scheduled resource amount is provided, the temporary transportation determination unit 122 proposes acceptable conditions of operation for transportation companies, and replies to the provisional transportation notification unit 103.

DATA CONFIGURATION EXAMPLE

FIG. 3 is a diagram illustrating a data structure example of the travel demand proposal 20 in this embodiment. The travel demand proposal 20 in this embodiment indicates a travel demand proposal of each of the passengers. In this case, the passengers have multiple travel demands, and multiple route proposals for each travel demand, and each route proposal is implemented by one or more transportations.

Each column of passenger 201, travel demand 202, and route 203 indicates a column of each identifier, and this example provides a composite key consisting of these three columns. The column 204 of transportation indicates a transportation used for traveling along route 203, the column of arrival and departure 205 indicates a departure point and an arrival point, that is, travel is made from which point to which point, and the column of hours 206 indicates hours in which arrival and departure preferably occur.

Also, column 221 of fare range indicates a range of fare which is acceptable by the passenger 201 as payment for the transportation 204 of the route 203 corresponding to the travel demand 202. Also, column 222 of finalization indicates a route (a route for which answered with Yes on the later-described screen of FIG. 12) as a target for selection in the passenger information exchange unit 111 of the passenger terminal 11. The column 223 of candidate indicates a passenger (a passenger for whom "notification when implemented" is checked on the later-described screen of FIG. 13) who requests a predetermined notification when the operation of a provisional transportation is determined.

FIG. 4 is a diagram illustrating a data structure example of a transportation supply proposal 30 for each transportation in this embodiment. In the transportation supply proposal 30, the column of each of transportation and resource is a column for identifying resources which can be supplied by each transportation, thereby providing a composite key identified by transportation, and resource.

Here, resource is, for instance, a combination of bus vehicles and crews in a bus operator, and it is equivalent to a minimum unit that achieves a temporary transportation.

Also, the column of hours indicates the hours in which the resource may be provided. Also, the column of route refers to routes that provide the above-mentioned resource. Also, the column of "finalization" indicates that resource provision is finalized, and the column "provisional" indicates that resource is provisionally determined for a provisional transportation.

FIG. 5A is a diagram illustrating a data structure example of travel demand in this embodiment, and FIG. 5B is a diagram illustrating a data structure example of transportation supply in this embodiment. Similarly to the travel demand proposal 20 of FIG. 3, the travel demand 40 indicates the travel demand of each passenger. Here, the difference from the travel demand proposal 20 in the travel demand 40 is that one route is finalized for one travel demand. Also, the difference is that assignments of a transportation (corresponding transportation) corresponding to and of a resource (corresponding resource) corresponding to the finalized route are illustrated. Similarly to the transportation supply proposal 30 of FIG. 4, the transportation supply 42 indicates a data structure regarding transportation supply of the transportation FIG. 6 is a diagram illustrating a data structure example of the travel demand history 50 in this embodiment. The travel demand history 50 in this embodiment basically has the same data configuration as the data configuration of the travel demand 40 illustrated in FIGS. 5A and 5B. However, the column of "Year, Month, Day" is added, which indicates travel demand in the past.

FIG. 7 is a diagram illustrating a data structure example of the passenger characteristics 60 in this embodiment. The passenger characteristics 60 in this embodiment is a table illustrating a priority for each item considered important for travel of each passenger, and includes passenger column that identifies a passenger, and the columns of time effect, congestion effect, fare effect, transfer effect, shopping effect, and payment intention, which are the above-mentioned items. In the passenger characteristics 60 of in this embodiment, the effects are the above-mentioned five effects, however, other effects may be added.

It is to be noted that in the passenger characteristics of in this embodiment, the priority of each of the above-mentioned effects indicates an example of the case where the priority is not affected by the travel demand or the route. However, a different case may be presumed depending on the travel demand or the route. In that case, for instance, in the travel demand proposal 20 of FIG. 3, a column of passenger characteristics maybe added, and a configuration may be adopted in which passenger characteristic is set for each record.

The values of time effect, congestion effect, fare effect, transfer effect, and shopping effect in the above-mentioned items each indicate a priority between the effects, in other words, a proportion in the entire effect. For instance, a time effect of "0.6" indicates that the importance of time accounts for 60% of the entire effect. The effect for the passenger is determined by the following Expression 1.

$$f = c + \sum_i a_i e_i x_i \qquad \text{(Expression 1)}$$

$a_1$: +1 or −1 (which is set according to the type of effect)
$e_1$: value of each effect
$x_1$: measured value for i
c: constant Payment intention in the effects indicates an amount of money which is acceptable by a passenger as payment for the transportation. In this example, the payment intention is normalized by km and time, and is set on the precondition that a passenger accepts to pay more for a long distance ride or a lone time ride. When a passenger rides on a provisional transportation, it is assumed that the passenger pays an amount of money according to an extension and a transportation time of the provisional transportation. It is to be noted that in this example, the payment intention is normalized by time and distance. However, the payment intention may be such that shorter the time, higher the payment.

FIG. 8 is a diagram illustrating a data structure example of the entity characteristics 70 in this embodiment. The entity characteristics 70 in this embodiment includes the columns of a transportation indicating a transportation entity, a lowest occupancy rate and a lowest fare necessary for the operation of the transportation by the transportation entity, a desirable occupancy rate and a desirable fare for the operation of the transportation by the transportation entity, and desirable hours for the operation.

Flow Example 1

Hereinafter, the actual steps of the traffic demand-and-supply matching method in this embodiment will be described with reference to the drawings. The various types of operations described below corresponding to the transportation demand-and-supply matching method are achieved by the program 2021 executed by the transportation demand-and-supply matching system 10. The program includes the codes for performing various operations described below.

Figure 9:
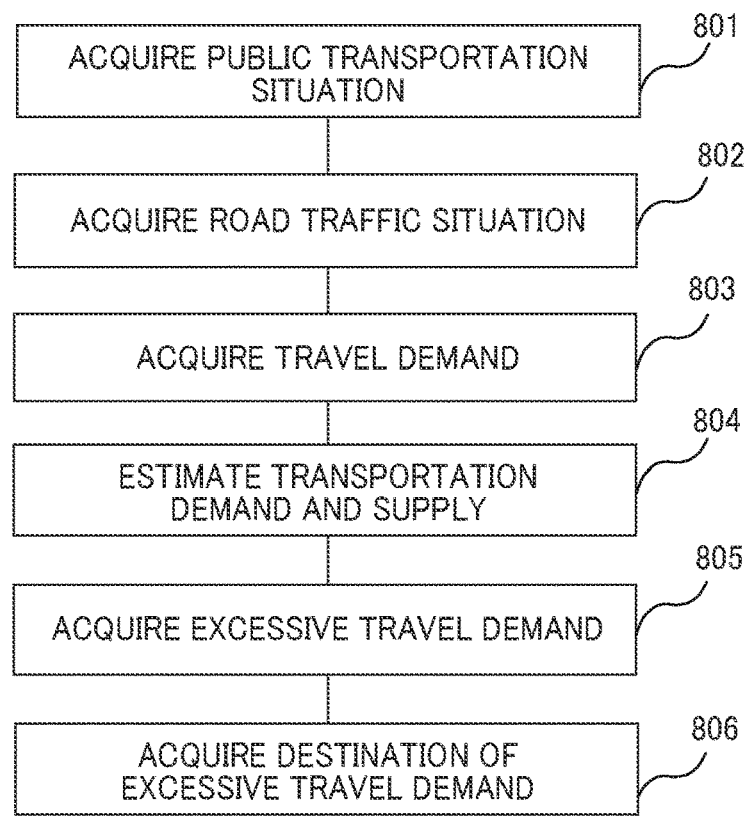
FIG. 9 is a diagram illustrating flow example 1 of a transportation demand-and-supply matching method in this embodiment.

FIG. 9 is a diagram illustrating flow example 1 of the transportation demand-and-supply matching method in this embodiment. Here, first, the transportation demand-and-supply matching system 10 executes the public transportation situation acquisition unit 105, the road traffic situation acquisition unit 106, and the travel demand acquisition unit 107, and makes acquisition of public transportation situations (801), acquisition of road traffic situations (802), and travel demand acquisition (803).

Subsequently, the transportation demand-and-supply matching system 10 refers to the public transportation situations, the road traffic situations, and the travel demand acquisition obtained in steps 801 to 803 described above, and makes estimation on the demand and supply for travel along the routes in a predetermined city (804).

At this point, all travel demands are not necessarily identified, and it may be difficult to estimate demand and supply for travel. In such a case, date and hours of the travel demand history 50 similar to the travel demand obtained at the present time are identified using the travel demand history 50 and the traffic volume of each transportation in the past, and the entire travel demand may be predicted based on the date and hours. For instance, for 7:00 to 8:00 a.m. in the period of "the weekdays of the second week in November", information on the travel demand has not been obtained this year, but travel demand history of "1000" is held for the same period, the same hours last year. In this case the travel demand this year is predicted to be "1000".

The transportation demand-and-supply matching system 10 calculates a demand-and-supply ratio between the travel demand and the transportation supply capability based on a result of estimate on travel demand in step 804 described above, and the transportation supply capability of each transportation.

For instance, a demand-and-supply ratio between stations of a railroad may be calculated by the following expression. (Travel demand between the stations (passenger/hour))/ (operation frequency x transported number of passengers of the train (passengers))/transportation time between the stations (hour).

For instance, the travel demand estimated for the 7:00 to 8:00 a.m. on November 10 from 'X station' to 'Y station' of 'A railroad' operated by a transportation entity is "4000 passengers/hour", the train operation frequency for the same route, hours, and date is "10", transported number of passengers is "500 passengers", and the transportation time between the stations is "1 hour". In this case, the demand-and-supply ratio can be calculated as (travel demand between the stations (passenger/hour))/(operation frequency×transported number of passengers of the train (passengers))/transportation time between the stations (hour)= 4000/((10×500)/1)=0.8.

Similarly, the travel demand estimated for from 'Y station' to 'Z station' of the aforementioned 'A railroad' for the same date, hours is "10000 passengers/hour", the train operation frequency for the same route, hours, and date is "10", transported number of passengers is "500 passengers", and the transportation time between the stations is "1 hour". In this case, the demand-and-supply ratio can be calculated as (travel demand between the stations (passenger/hour))/(operation frequency×transported number of passengers of the train (passengers))/transportation time between the stations (hour)=10000/((10×500)/1)=2.0. That is, for the route from 'Y station' to 'Z station,' the demand is identified to be excessive.

Also, the demand-and-supply ratio for road traffic can be calculated as (travel demand between two points (passenger/hour))/(operation frequency×transported number of passenger of proposed resource (passenger))/transportation time of the resource (hour)).

By thus calculated demand-and-supply ratio, it is possible to identify a transportation and a route that have unbalanced demand and supply between the travel demand and the transportation supply capability.

Subsequently, the transportation demand-and-supply matching system 10 identifies excessive travel demands from the calculated demand-and-supply ratios (805). Finally, for the excessive travel demand, corresponding travel demand identified, that is, the destination is identified (806). In the above-mentioned example, 'Z station' is identified as the destination with an excessive travel demand.

Flow Example 2

Figure 10:
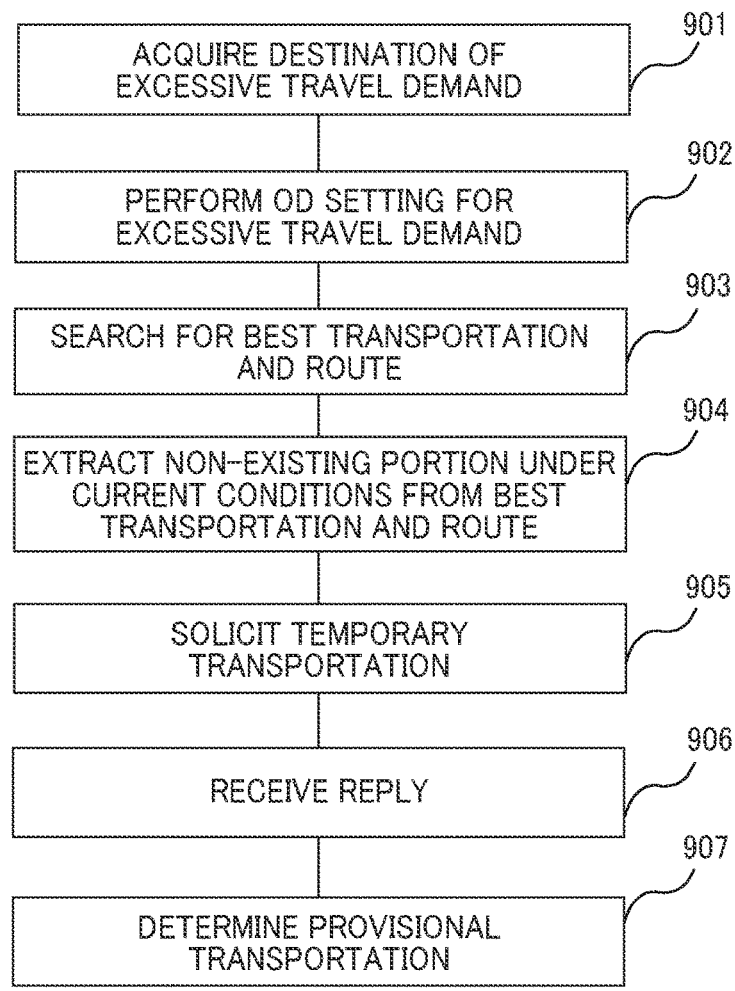
FIG. 10 is a diagram illustrating flow example 2 of the transportation demand-and-supply matching method in this embodiment.

FIG. 10 is a diagram illustrating the processing flow of solicitation of temporary transportation and determination and notification of provisional transportation. In this case, the transportation demand-and-supply matching system 10 obtains the destination with an excessive travel demand (901) from each of excessive travel demands obtained in the above-described step (806). Subsequently, the transportation demand-and-supply matching system 10 performs OD setting for the above-mentioned excessive travel demands (902). OD refers to the origin (start point) and the destination (end point) in a flow of people or objects, and OD setting indicates setting of search for path for which the end point is a destination with excessive travel demand and the start point has the travel demand.

Subsequently, the transportation demand-and-supply matching system 10 retrieves a transportation and a route satisfying the OD setting by using a predetermined route search algorithm (which may be pre-stored as the program 2021 or utilized upon inquiry to an external device) for performing transfer or route retrieval of various transportations (903).

When the retrieval in the above-mentioned 903 is performed, the transportation demand-and-supply matching system 10 identifies the route, along which transportation on a road is made by an automobile and not by a transportation such as a railroad, as a route which has no corresponding transportation under the current situation (904). For instance, when 'X station' is the origin and 'Z station' is the destination, it is assumed that the route which is 'a predetermined road K' that connects 'Y station' and 'Z station' is identified, where a bus is used for transport along 'the road K.'

Subsequently, for the route identified in 904, the transportation demand-and-supply matching system 10 transmits solicitation notification of temporary transportation to the entity system 12 of each transportation entity (905). The solicitation notification includes at least information on the relevant route, an interface for receiving acceptance or non-acceptance of the operation of the provisional transportation for the relevant route, and for receiving a reply regarding conditions (acceptance conditions) in the case of acceptance. In the above-mentioned example, the solicitation notification includes notification content for soliciting operation of bus which is currently non-operational for 'a predetermined road K' that connects 'Y station' and 'Z station,' an appropriate interface such as a radio button for receiving acceptance or non-acceptance of the operation, and an input interface for inputting conditions (example: conditions corresponding to items of the lowest occupancy rate, the lowest fare illustrated in FIG. 8) in the case of acceptance.

Meanwhile, the entity system 12 of a transportation entity receives the above-mentioned solicitation notification, and displays the solicitation notification on an appropriate display device by the situation presentation unit 121. A predetermined staff-in-charge of the transportation entity views the solicitation notification, and reviews the conditions when the operation of temporary transportation is accepted, which are indicated by the solicitation notification, in short, reviews the acceptance conditions. The entity system 12 receives a result of the review by an input device, and transmits a reply to the solicitation notification to the transportation demand-and-supply matching system 10.

For instance, in the above-described example, the reply includes an answer of acceptance of operation of the bus which is currently non-operational for 'the predetermined road K' that connects 'Y station' and 'Z station,' and information such as "the lowest occupancy rate should be achieved" which is the acceptance conditions in the case of acceptance.

Subsequently, the transportation demand-and-supply matching system 10 receives the above-mentioned reply (906), and refers to the entity characteristics 70 of each transportation entity who has transmitted the reply, identifies a transportation entity (transportation in FIG. 8) that matches the acceptance conditions of each transportation entity, indicated by the reply, and determines that a temporary transportation which may be operated by the transportation entity is a provisional transportation (907). For instance, the transportation demand-and-supply matching system 10 determines that a bus which may be operated along the route of 'road K' by 'D bus line' at predetermined date and time is a provisional transportation.

In this processing, in the table of transportation supply 42 of FIG. 5, the transportation demand-and-supply matching system 10 sets a predetermined flag indicating provisional registration in "provisional" column of the records of a transportation (a railroad operator or a bus operator) corresponding to the provisional transportation and the resource (a bus, or a railroad).

Flow Example 3

Figure 11:
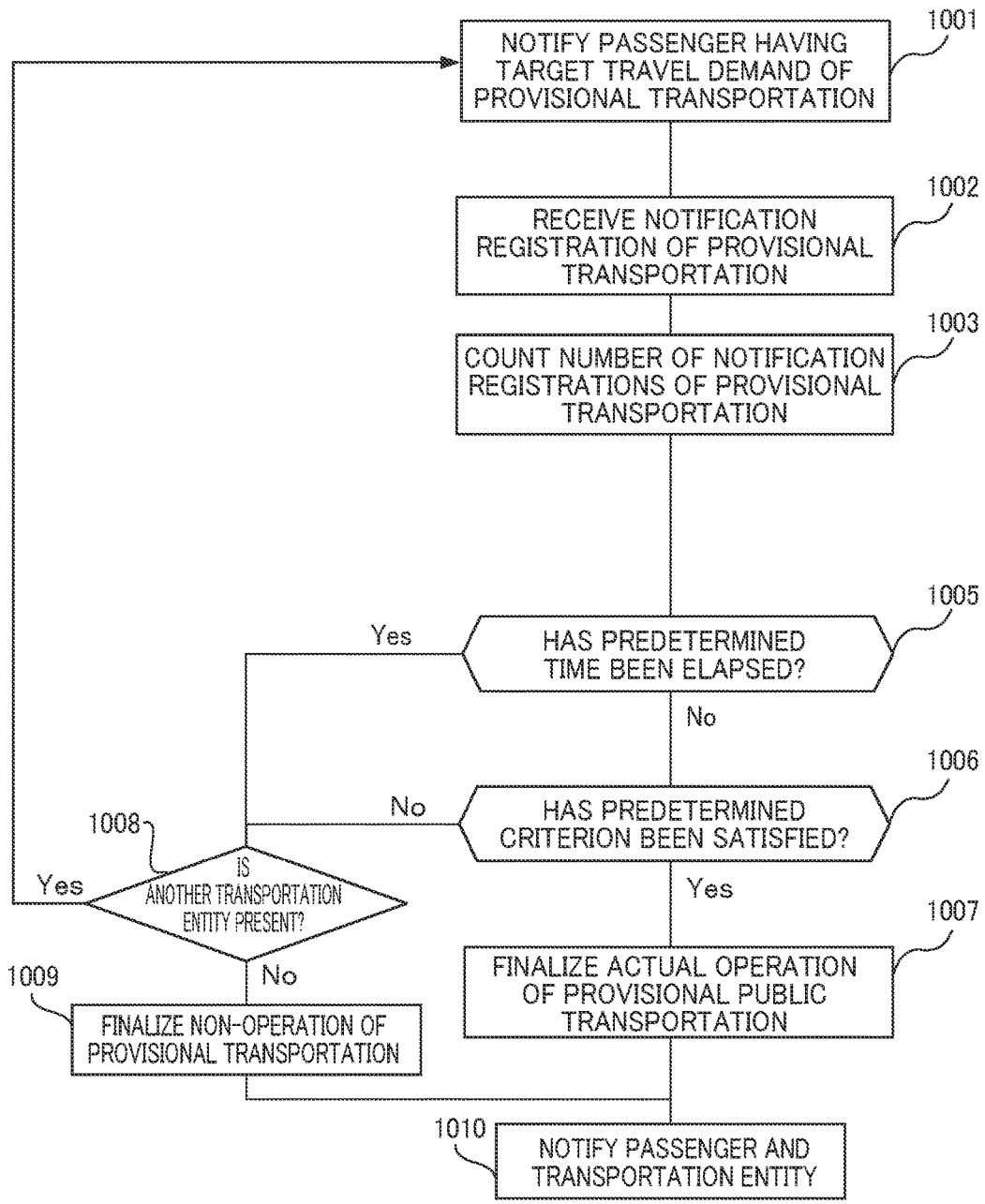
FIG. 11 is a diagram illustrating flow example 3 of the transportation demand-and-supply matching method in this embodiment.

FIG. 11 is a flowchart illustrating processing flow of notification and finalization of a provisional transportation. In this case, the transportation demand-and-supply matching system 10 refers to the travel demand 40 using the route in the provisional transportation determined in the above-mentioned step (907) as a key, identifies the passenger out of the passengers, for which the route in the travel demand matches the route of the provisional transportation (or included in the route of the provisional transportation), and transmits a notification regarding the presence of a provisional transportation that satisfies the travel demand (1001).

Then the passenger terminal 11, which has received the notification, displays information on a provisional transportation and information on existing transportations obtained by a predetermined route search algorithm on the display device by the passenger information exchange unit 111.

Figure 12:
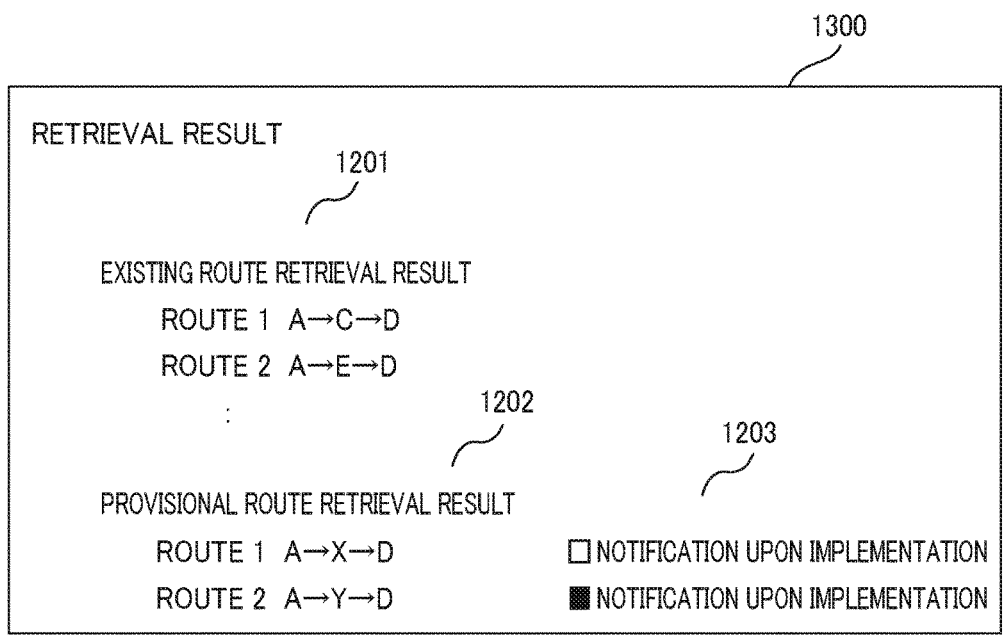
FIG. 12 is a diagram illustrating screen example 1 in this embodiment.

FIG. 12 illustrates an example of a screen 1300 displayed in the above-mentioned passenger terminal 11. On the screen 1300, the information on the provisional transportation is presented, and an intention of utilizing a provisional transportation is received from passengers. The example of FIG. 12 displays existing route retrieval results 1201 each of which is a combination of the routes already obtained from the passengers as the travel demand, that is, existing transportations, and provisional route retrieval results 1202 which is a route using a provisional transportation together.

Also, the screen 1300 has a "notification upon implementation" button 1203 that receives an intention of utilizing each provisional route retrieval result, that is, a provisional transportation. A passenger who has viewed the screen 1300 clicks the "notification upon implementation" button 1203 for a desirable provisional route retrieval result 1202, thereby sending an intention of utilizing the provisional transportation when implemented to the center side. When the "notification upon implementation" button 1203 on the screen 1300 is clicked, the passenger terminal 11 notifies the transportation demand-and-supply matching system 10 of a notification registration request that is a request for registration of an intention of utilizing the provisional transportation.

Meanwhile, the transportation demand-and-supply matching system 10 receives the above-mentioned registration request from each passenger terminal 11 (1002), and count the number of registration request regarding the provisional transportation (1003).

Here, the transportation demand-and-supply matching system 10 determines whether or not, for instance, the elapsed time from the above-described step (1001) has reached a predetermined stipulated time (1005).

When the lapsed time from the above-described step (1001) has reached the predetermined stipulated time (Yes in 1005) as a result of the above-described determination, the transportation demand-and-supply matching system 10 performs the same processing as step (907) of the above-described flow example 2, and searches for another transportation entity (1008).

When another transportation entity is identifiable as a result of the research (Yes in 1008), the transportation demand-and-supply matching system 10 returns the processing to the above-described step in order to perform processing for another transportation entity (1001). On the other hand, when another transportation entity is not identifiable as a result of the research (No in 1008), the transportation demand-and-supply matching system 10 finalizes that the provisional transportation is not to be operated (1009), and notifies the passenger terminal 11 and the entity system 12 of the relevant transportation entity of the finalization (1010).

On the other hand, when the lapsed time from the above-described step (1001) has not reached the predetermined stipulated time (No in 1005) as a result of the above-described step (1005), the transportation demand-and-supply matching system 10 determines whether or not the number of notification registrations counted in step (1003) has reached a predetermined desirable criterion (1006). In other words, it is determined whether or not support from many passengers has been gained for the operation of the provisional transportation.

When the number of notification registrations counted has not reached the predetermined desirable criterion (No in 1006) as a result of the above-described determination, the transportation demand-and-supply matching system 10 proceeds the processing to the above-described step (1008).

On the other hand, when the number of notification registrations counted has reached the predetermined desirable criterion (Yes in 1006) as a result of the above-described determination, the transportation demand-and-supply matching system 10 determines that actual operation of the provisional transportation is finalized (1007), and notifies the passenger terminal 11 and the entity system 12 of the finalization (1010).

Figure 13:
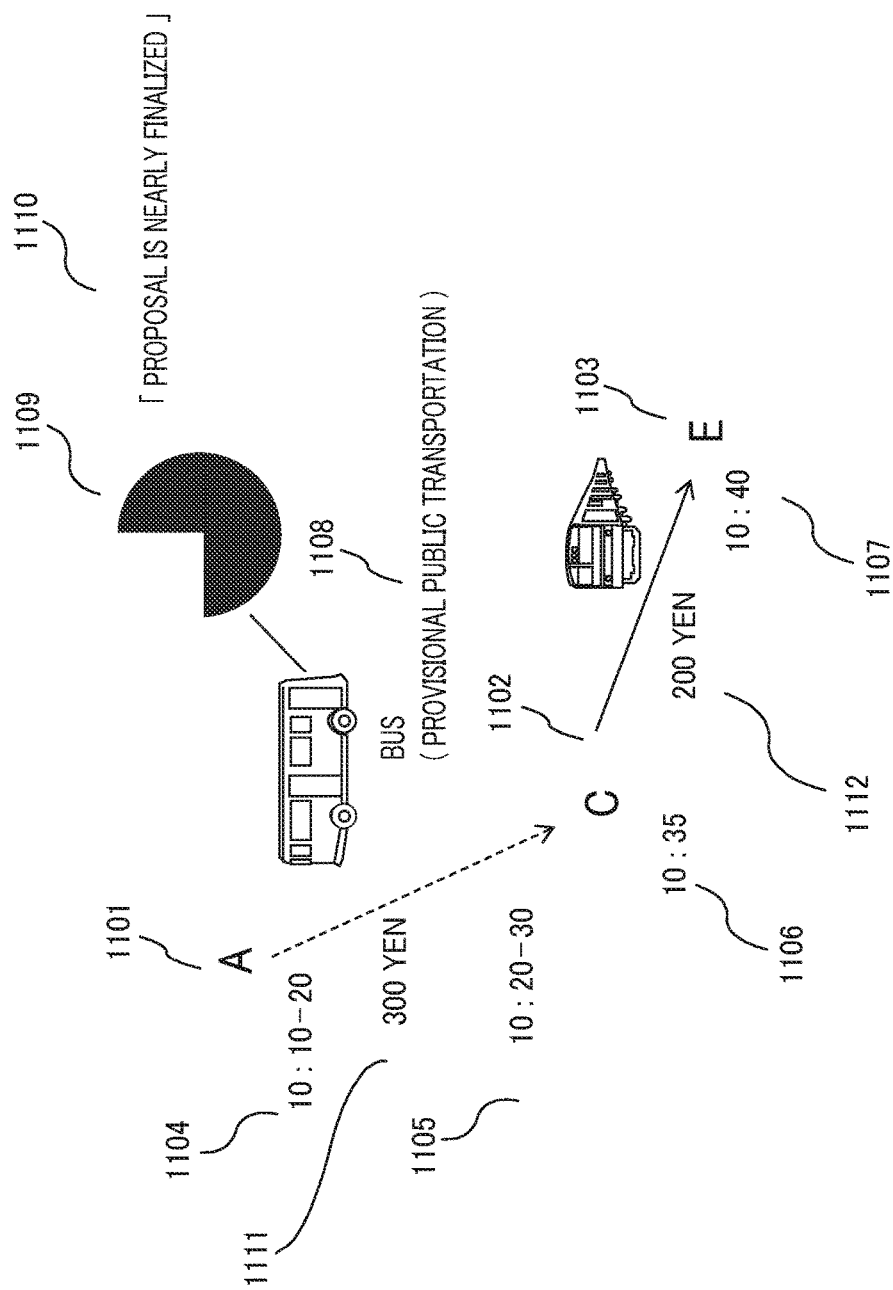
FIG. 13 is a diagram illustrating screen example 2 in this embodiment.

As the consequence of the above-described step (1010), the passenger information exchange unit 111 of the passenger terminal 11 receives the notification, and FIG. 13 illustrates a screen 1200 that displays the number of notification registrations counted for the provisional transportation. It is to be noted that it is preferable that the transportation demand-and-supply matching system 10 perform the above-described step (1003) regularly, and notify the passenger terminal 11 and the entity system 12 of the relevant transportation entity of the screen 1200 as a result of the processing.

This example illustrates a situation in which a passenger travels from 'point A' at the departure to 'point E' at the destination by transferring from a provisional transportation to an existing public transportation. In this case, information on a transportation from 'point A 1101' to 'point C 1102' is to be a bus that is a provisional transportation, on a departure time 1104 and an arrival time 1105 of the bus, and on a desirable fare 1111 for a transportation entity which has scheduled to operate the bus are illustrated. Furthermore, a text display 1110 and a circle graph 1109, which indicate the state of support gained from the passengers for the provisional transportation, are also included. The circle graph 1109 can express the proportion of the circle graph, for instance, by the following expression using the entity characteristic information, for instance.

((The number of candidates for travel demands at the current point/the seating capacity of the vehicle×100−the lowest occupancy rate))/((desirable occupancy rate−lowest occupancy rate)).

In this manner, each passenger can be notified of the possibility of implementation of the operation of a provisional transportation, and thus it can be expected that more passengers are obtained for the provisional transportation. Also, a situation, in which support from the passengers is not sufficient and sufficient profit is not guaranteed in a preliminary step toward implementation of a provisional transportation, can be presented to a transportation entity, and thus it is possible to provide the transportation entity with an opportunity to reliably avoid unnecessary business risk.

Figure 14:
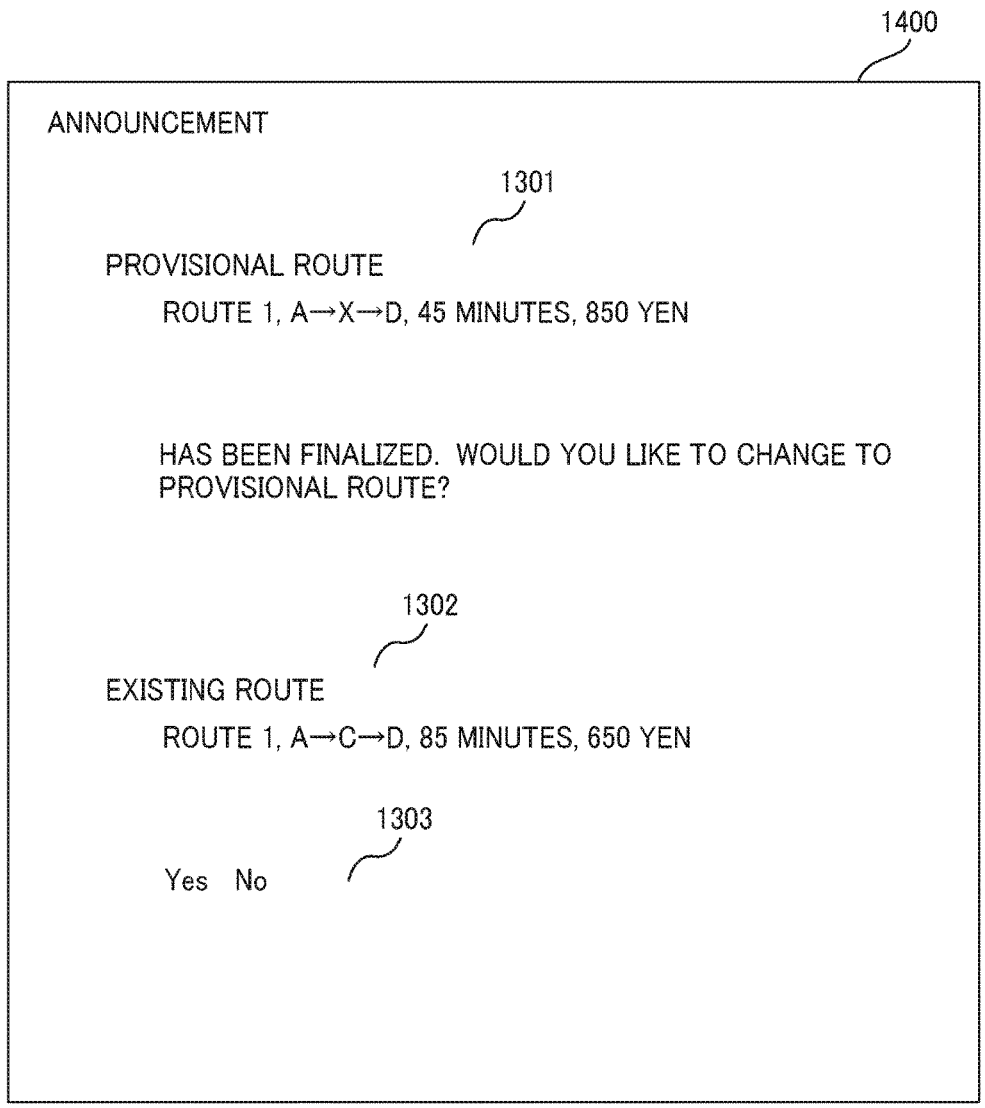
FIG. 14 is a diagram illustrating screen example 3 in this embodiment.

FIG. 14 is an example of a provisional transportation finalization announcement screen 1400 that is displayed in the passenger information exchange unit 111 of the passenger terminal 11 as the consequence of the above-described step (1010). The screen 1400 includes information (1301) on a route actually established as a provisional route for a provisional transportation, on the transportation time and fare of the route. Also, a display is included, which makes an inquiry as to whether route change is made to a finalized provisional transportation. Display of a currently adopted existing route 1302 (that is, a route by an existing transportation) for comparison and reference in the inquiry is also included. In addition, YES-No button 1303 for route change is also provided. A result of clicking the button 1303 is sent to the transportation demand-and-supply matching system 10, and stored as the travel demand history 50 which is used for estimation of travel demand in the future.

Although the best mode for carrying out the present disclosure has been specifically described above, the disclosure is not limited to this, and various modifications may be made in a range without departing from the spirit of the disclosure.

According to this embodiment, matching between demand and supply for travel is performed based on multiple travel demands and multiple transportations in a predetermined area, and a provisional transportation (operation route), which copes with a discrepancy in the demand and supply relationship, can be proposed to passengers and transportation companies. Also, in this case, it is possible to check the reactions of passengers regarding an intention of utilizing the provisional transportation are checked, and to provide an estimate of profitability of the transportation and information for making a decision to avoid business risk to a transportation entity that provides the provisional transportation.

In other words, determination of propriety of starting an operation of a new transportation that can cope with the travel demand is facilitated in an area where multiple transportations and travel routes are present.

According to the description of the present Specification, at least the following matters will be revealed: Specifically, the transportation demand-and-supply matching system of this embodiment may be such that the arithmetic device further performs processing of notifying a terminal of each of passengers of the congested route of a request for checking presence or absence of utilization desire regarding the avoidance route and the provisional transportation, every time reply indicating presence of utilization desire of the passenger is obtained from the terminal, incrementing a predetermined value which is according to a degree of the utilization desire from the passenger, and which indicates feasibility of the avoidance route and the provisional transportation, and notifying at least one of the terminal of the passenger and a terminal of an entity who schedules an operation of the provisional transportation, of information on the predetermined value.

According to this, it is possible to clarify the number of people who desire to utilize a provisional transportation, and to make passengers and transportation companies recognize the situation. The number of people who desire to utilize a provisional transportation is information that directly affects to the estimate of sales when the transportation is operated, and eventually determination of propriety of starting an operation of a new transportation that can cope with the travel demand is further facilitated in an area where multiple transportations and travel routes are present.

In addition, the transportation demand-and-supply matching system of this embodiment may be such that the arithmetic device, when notifying the terminal of each of passengers of the congested route of a request for checking presence or absence of utilization desire regarding the avoidance route and the provisional transportation, transmits information on existing transportations and routes including at least the congested transportation and the congested route identified according to a route retrieval request by the passenger, information on the avoidance route and the provisional transportation, and an input interface for the presence or absence of utilization desire.

According to this, the passengers can recognize each provisional transportation that can avoid the congestion based on the congested situation of travel routes, and can verify the significance of utilizing the provisional transportation more clearly and simply. Eventually, the intentions of the passengers who desire to utilize the provisional transportation are identified more quickly with high accuracy, and determination of propriety of starting an operation of a new transportation that can cope with the travel demand is further facilitated in an area where multiple transportations and travel routes are present.

In addition, the transportation demand-and-supply matching system of this embodiment may be such that the arithmetic device further performs processing of comparing the predetermined value indicating the feasibility with a predetermined reference, and notifying at least one of the terminal of the passenger and the terminal of the entity of the provisional transportation, of information according to a degree of achievement with respect to the predetermined reference.

According to this, it is possible to further clarify the number of people who desire to utilize a provisional transportation, and to make passengers and transportation companies recognize the situation. Eventually, determination of propriety of starting an operation of a new transportation that can cope with the travel demand is further facilitated in an area where multiple transportations and travel routes are present.

In addition, the transportation demand-and-supply matching system of this embodiment may be such that the arithmetic device further performs processing of, when the predetermined value indicating the feasibility achieves the predetermined reference, determining that the avoidance route and the provisional transportation is implemented by the entity, and notifying at least one of the terminal of the passenger and the terminal of the entity scheduling the operation of the provisional transportation, of implementation of the avoidance route and the provisional transportation.

According to this, it is possible to reliably instruct an entity to start the operation of a provisional transportation, and to quickly and simply notify the passengers who desire to utilize the provisional transportation that the operation of the provisional transportation is started. Eventually, determination of propriety of starting an operation of a new transportation that can cope with the travel demand is further facilitated in an area where multiple transportations and travel routes are present.

In addition, the transportation demand-and-supply matching system of this embodiment may be such that the storage device further holds information on passenger characteristics indicating priority factors for the passenger regarding travel, and information on entity characteristics indicating priority factors for an entity of each transportation regarding operation of the transportation, and the arithmetic device, when estimating the avoidance route and the provisional transportation, identifies a provisional transportation in which the passenger characteristics and the entity characteristics match each other, based on information on passenger characteristics regarding the passenger of the congested route, and information on entity characteristics regarding the entity of the provisional transportation which has to be operated on the avoidance route for avoiding the congested route.

According to this, it is possible to identify a provisional transportation that matches the items such as the time and fare for travel, easiness of transfer, and a degree of congestion, on which passengers place higher priority, and to make the passengers and companies recognize the provisional transportation. The number of people who desire to utilize a provisional transportation matching the need of such passengers is information that directly affects to the estimate of sales when the transportation is operated, eventually, determination of propriety of starting an operation of a new transportation that can cope with the travel demand is further facilitated in an area where multiple transportations and travel routes are present.

In addition, the transportation demand-and-supply matching system of this embodiment may be such that the arithmetic device, when identifying the matching provisional transportation, identifies the provisional transportation in which the passenger characteristics and the entity characteristics match each other, based on information on an acceptable range regarding operation hours and fares of provisional transportations, out of the information on entity characteristics.

According to this, it is possible to identify a provisional transportation which is acceptable by an entity in terms of operation costs and operation management, and eventually, determination of propriety of starting an operation of a new transportation that can cope with the travel demand is further facilitated in an area where multiple transportations and travel routes are present.

In addition, the transportation demand-and-supply matching method of this embodiment may be such that the information processing system further performs processing of notifying a terminal of each of passengers of the congested route of a request for checking presence or absence of utilization desire regarding the avoidance route and the provisional transportation, every time reply indicating presence of utilization desire of the passenger is obtained from the terminal, incrementing a predetermined value which is according to a degree of the utilization desire from the passenger, and which indicates feasibility of the avoidance route and the provisional transportation, and notifying at least one of the terminal of the passenger and a terminal of an entity who schedules an operation of the provisional transportation, of information on the predetermined value.

In addition, the transportation demand-and-supply matching method of this embodiment may be such that the information processing system, when notifying the terminal of each of passengers of the congested route of a request for checking presence or absence of utilization desire regarding the avoidance route and the provisional transportation, transmits information on existing transportations and routes including at least the congested transportation and the congested route identified according to a route retrieval request by the passenger, information on the avoidance route and the provisional transportation, and an input interface for the presence or absence of utilization desire.

In addition, the transportation demand-and-supply matching method of this embodiment may be such that the information processing system further performs processing of comparing the predetermined value indicating the feasibility with a predetermined reference, and notifying at least one of the terminal of the passenger and the terminal of the entity of the provisional transportation, of information according to a degree of achievement with respect to the predetermined reference.

In addition, the transportation demand-and-supply matching method of this embodiment may be such that the information processing system further performs processing of, when the predetermined value indicating the feasibility achieves the predetermined reference, determining that the avoidance route and the provisional transportation is implemented by the entity, and notifying at least one of the terminal of the passenger and the terminal of the entity scheduling the operation of the provisional transportation, of implementation of the avoidance route and the provisional transportation.

In addition, the transportation demand-and-supply matching method of this embodiment may be such that the information processing system further holds information on passenger characteristics indicating priority factors for the passenger regarding travel, and information on entity characteristics indicating priority factors for an entity of each transportation regarding operation of the transportation in the storage device, and when estimating the avoidance route and the provisional transportation, identifies a provisional transportation in which the passenger characteristics and the entity characteristics match each other, based on the information on passenger characteristics regarding the passenger of the congested route, and the information on entity characteristics regarding the entity of the provisional transportation which has to be operated on the avoidance route for avoiding the congested route.

In addition, the transportation demand-and-supply matching method of this embodiment may be such that the information processing system, when identifying the matching provisional transportation, identifies the provisional transportation in which the passenger characteristics and the entity characteristics match each other, based on information on an acceptable range regarding operation hours and fares of provisional transportations, out of the information on entity characteristics.

What is claimed is:

1. A transportation demand-and-supply matching system, comprising:
   a storage device that stores information on each of travel demand and transportation supply capability in a predetermined area; and
   an arithmetic device that estimates whether a congested route in the area is congested and identifies a congested-route transportation vehicle on the congested route based on the information on each of the travel demand and the transportation supply capability, estimates an avoidance route for avoiding the congested route, and a provisional transportation vehicle which may be operated on the avoidance route in the area by a predetermined algorithm, and outputs information on each of the avoidance route and the provisional transportation vehicle to a predetermined device,
   wherein the arithmetic device further performs processing of notifying a terminal of each of passengers of the congested route of a request for checking a presence or absence of utilization desire regarding the avoidance route and the provisional transportation vehicle, and
   wherein, every time a reply indicating the presence of the utilization desire of the passenger is obtained from the terminal, the arithmetic device increments a predetermined value which is based on a degree of the utilization desire from the passenger and which indicates a feasibility of the avoidance route and the provisional transportation vehicle, and notifies at least one of the terminal of the passenger and a terminal of an entity who schedules an operation of the provisional transportation vehicle of information on the predetermined value.

2. The transportation demand-and-supply matching system according to claim 1, wherein the arithmetic device, when notifying the terminal of each of passengers of the congested route of the request for checking the presence or absence of utilization desire regarding the avoidance route and the provisional transportation vehicle, transmits information on existing transportation vehicles and routes including at least the congested-route transportation vehicles and the congested route identified according to a route retrieval request by the passenger, information on the avoidance route and the provisional transportation vehicle, and an input interface for the presence or absence of utilization desire.

3. The transportation demand-and-supply matching system according to claim 1, wherein the arithmetic device further performs processing of comparing the predetermined value indicating the feasibility with a predetermined reference, and notifying at least one of the terminal of the passenger and the terminal of the entity of the provisional transportation vehicle, of information according to a degree of achievement with respect to the predetermined reference.

4. The transportation demand-and-supply matching system according to claim 3, wherein the arithmetic device further performs processing of, when the predetermined value indicating the feasibility achieves the predetermined reference, determining that the avoidance route and the provisional transportation vehicle is implemented by the entity, and notifying at least one of the terminal of the passenger and the terminal of the entity scheduling the operation of the provisional transportation vehicle, of implementation of the avoidance route and the provisional transportation vehicle.

5. The transportation demand-and-supply matching system according to claim 1, wherein the storage device further holds information on passenger characteristics indicating priority factors for the passenger regarding travel, and information on entity characteristics indicating priority factors for an entity of each transportation vehicle regarding operation of the transportation vehicle, and the arithmetic device, when estimating the avoidance route and the provisional transportation vehicle, identifies a provisional transportation vehicle in which the passenger characteristics and the entity characteristics match each other, based on information on passenger characteristics regarding the passenger of the congested route, and information on entity characteristics regarding the entity of the provisional transportation vehicle which has to be operated on the avoidance route for avoiding the congested route.

6. The transportation demand-and-supply matching system according to claim 5, wherein the arithmetic device, when identifying the matching provisional transportation vehicle, identifies the provisional transportation vehicle in which the passenger characteristics and the entity characteristics match each other, based on information on an acceptable range regarding operation hours and fares of provisional transportation vehicles, out of the information on entity characteristics.

7. A transportation demand-and-supply matching method performed by an information processing system including an arithmetic device and a storage device that stores information on travel demand and transportation supply capability in a predetermined area for processing by the arithmetic device, comprising:

estimating whether a congested route in the area is congested and identifying a congested-route transportation vehicle on the congested route based on the information on each of the travel demand and the transportation supply capability;

estimating an avoidance route for avoiding the congested route, and a provisional transportation vehicle which may be operated on the avoidance route in the area by a predetermined algorithm;

outputting information on each of the avoidance route and the provisional transportation vehicle to a predetermined device; and notifying a terminal of each of passengers of the congested route of a request for checking a presence or absence of utilization desire regarding the avoidance route and the provisional transportation vehicle; and every time a reply indicating the presence of utilization desire of the passenger is obtained from the terminal, incrementing, by the arithmetic device, a predetermined value which is based on a degree of the utilization desire from the passenger, and which indicates feasibility of the avoidance route and the provisional transportation vehicle, and notifies at least one of the terminal of the passenger and a terminal of an entity who schedules an operation of the provisional transportation vehicle, of information on the predetermined value.

8. The transportation demand-and-supply matching method according to claim 7, further comprising, when notifying the terminal of each of passengers of the congested route of the request for checking the presence or absence of utilization desire regarding the avoidance route and the provisional transportation vehicle, transmitting information on existing transportation vehicles and routes including at least the congested transportation and the congested route identified according to a route retrieval request by the passenger, information on the avoidance route and the provisional transportation vehicle, and an input interface for the presence or absence of utilization desire.

9. The transportation demand-and-supply matching method according to claim 7, further comprising comparing the predetermined value indicating the feasibility with a predetermined reference, and notifying at least one of the terminal of the passenger and the terminal of the entity of the provisional transportation vehicle, of information according to a degree of achievement with respect to the predetermined reference.

10. The transportation demand-and-supply matching method according to claim 9, further comprising, when the predetermined value indicating the feasibility achieves the predetermined reference, determining that the avoidance route and the provisional transportation is implemented by the entity, and notifying at least one of the terminal of the passenger and the terminal of the entity scheduling the operation of the provisional transportation vehicle, of implementation of the avoidance route and the provisional transportation vehicle.

11. The transportation demand-and-supply matching method according to claim 7, wherein information on passenger characteristics indicating priority factors for the passenger regarding travel, and information on entity characteristics indicating priority factors for an entity of each transportation vehicle regarding operation of the transportation vehicle are held in the storage device of the information processing system, the transportation demand-and-supply matching method further comprising, when estimating the avoidance route and the provisional transportation vehicle, identifying a provisional transportation vehicle in which the passenger characteristics and the entity characteristics match each other, based on the information on passenger characteristics regarding the passenger of the congested route, and the information on entity characteristics regarding the entity of the provisional transportation vehicle which has to be operated on the avoidance route for avoiding the congested route.

12. The transportation demand-and-supply matching method according to claim 11, further comprising, when identifying the matching provisional transportation vehicle, identifying the provisional transportation vehicle in which the passenger characteristics and the entity characteristics match each other, based on information on an acceptable range regarding operation hours and fares of provisional transportation vehicles, out of the information on entity characteristics.

\* \* \* \* \*